March 26, 1935.   A. B. LAMOY   1,995,681
SLED
Original Filed Oct. 17, 1930   2 Sheets-Sheet 1
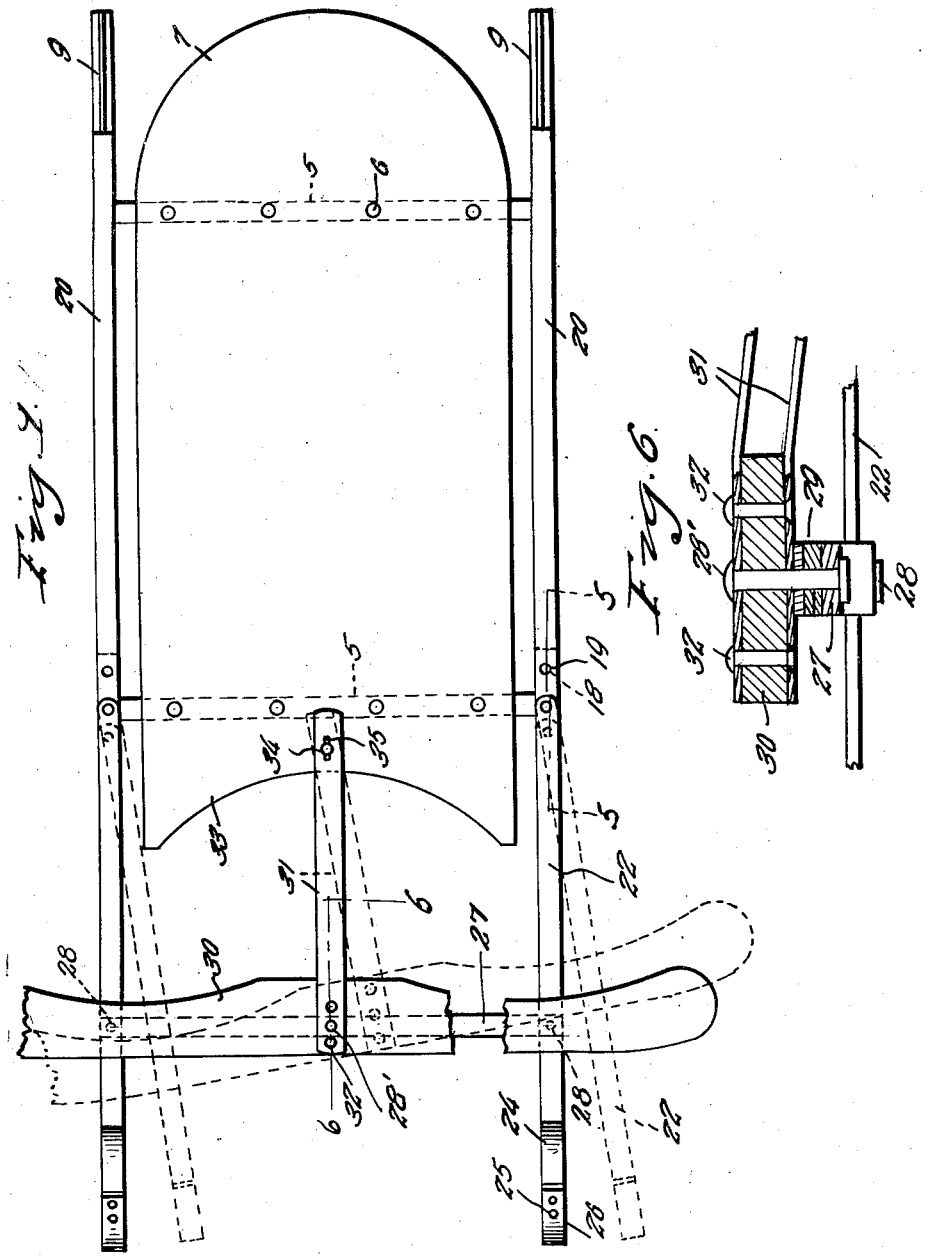
Inventor
Albert B. Lamoy
By Clarence A. O'Brien
Attorney March 26, 1935. A. B. LAMOY 1,995,681
SLED
Original Filed Oct. 17, 1930 2 Sheets-Sheet 2
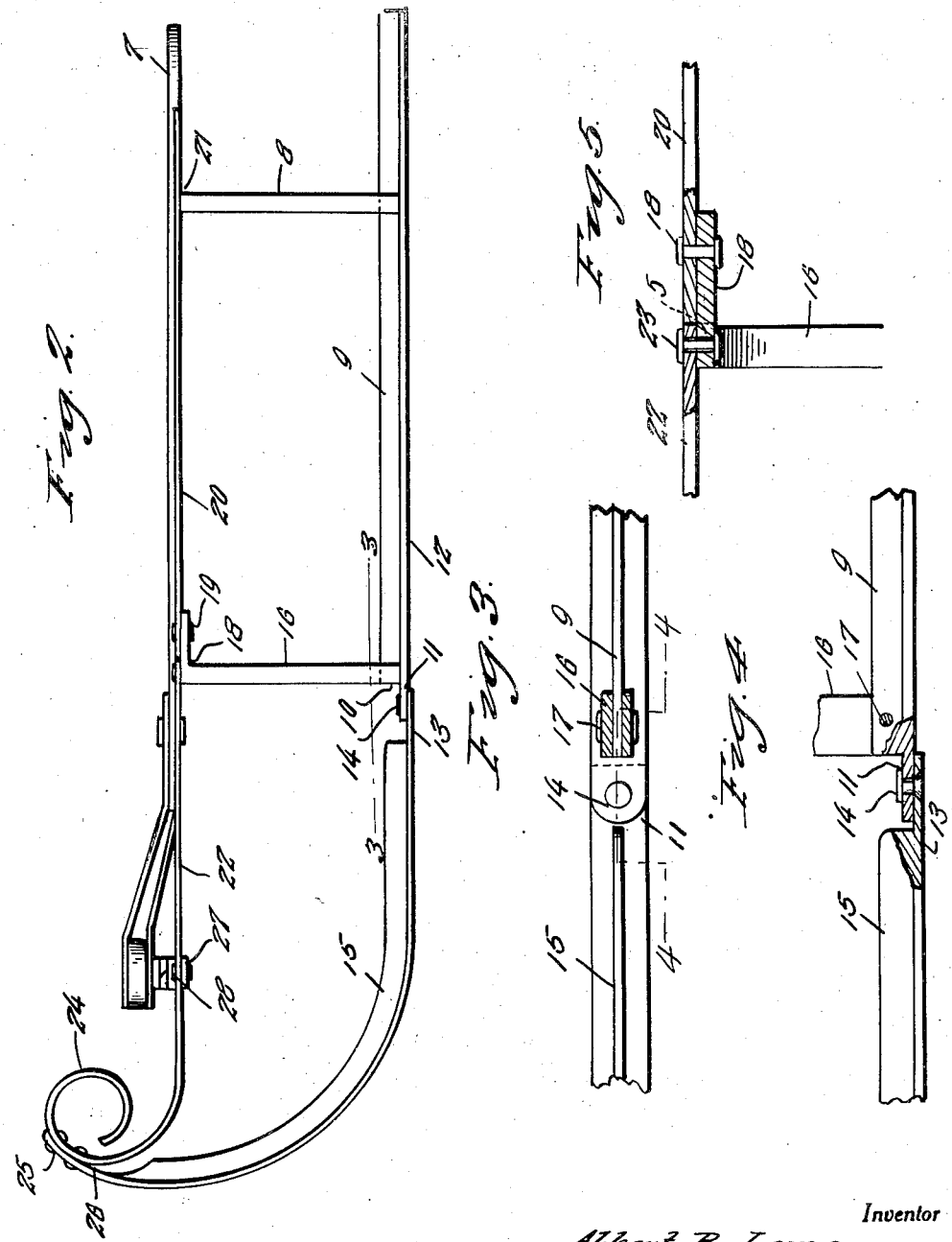
Inventor
Albert B. Lamoy
By Clarence A. O'Brien
Attorney Patented Mar. 26, 1935

1,995,681

UNITED STATES PATENT OFFICE 1,995,681

SLED

Albert B. Lamoy, West Chazy, N. Y.

Application October 17, 1930, Serial No. 489,459
Renewed September 10, 1934

7 Claims. (Cl. 280—22)

This invention relates generally to improvements in sleds, having jointed runners, whereby the sleds may be readily steered.

An important object of the invention is to provide an improved construction whereby the jointed runners of the sled may be readily actuated to steer the sled in the desired direction, and having means whereby the steering mechanism is yieldingly held against turning as the sled is drawn along the ground.

It is another object of this invention to provide a sled of this type which may be quickly and easily and very cheaply manufactured, and which will be at the same time rugged and strong and very satisfactory in operation.

These and other objects of the invention, its nature, and its composition and arrangement and combination of parts will be readily understood by any one acquainted with the art to which this invention relates upon consulting the following descriptions of the drawings, in which:—

Figure 1 is a general top plan view of my improved sled showing in dotted lines a possible deformation of the runners by the steering mechanism.

Figure 2 is a general side elevational view of Figure 1.

Figure 3 is a horizontal cross sectional view approximately on the line 3—3 of Figure 2.

Figure 4 is a detailed partial central vertical sectional view taken on the line 4—4 of Figure 3.

Figure 5 is a vertical longitudinal sectional view taken approximately on the line 5—5 of Figure 1.

Figure 6 is a vertical longitudinal section approximately on the line 6—6 of Figure 1.

Referring in detail to the drawings, it will be seen that the numeral 5 designates a pair of cross members secured by means of rivets or the like to the underside of a top plate 7 which constitutes the seat of the sled. A pair of vertical brackets 8 depend from the ends of the rear member 5, and the lower ends of the brackets 8 are slotted to receive the vertical member of T-shaped runner sections 9 to which they are secured by any suitable means such as a bolt or rivet running therethrough. The runner sections 9 extend rearwardly and forwardly and terminate forwardly of the middle portion of the sled as indicated at 10, and have a horizontal forward projection 11 in the horizontal plane of their flat ground engaging portion 12. To the underside of the projection 11 is pivotally secured a similar rearward projection 13 on the front runner section 15 by means of a countersunk rivet or bolt 14 which permits the front runner section to swing laterally relative to the rear runner section 9. The front runner section 15 extends forwardly and is curved upwardly as indicated in the drawings. At the forward terminal 10 of the vertical member of the rear runner section 9 is a vertical bracket 16 whose lower end is slotted as shown in Figure 3 to receive the vertical member of the runner section 9 to which it is riveted or bolted as indicated at 17. The bracket 16 has on its upper end a rearwardly directed portion 18, to the rear portion of which is secured the front end as indicated at 19 of a metal bar 20 which extends rearwardly and is supported on the outer end of the rear cross member 5 as indicated at 21 and constitutes the upper section of the rear or stationary runner. As indicated in the drawings there is a bracket structure 16 on each side of the sled, and there is also another bar 20 provided for the side of the sled opposite that shown in Figure 2. Immediately at the top of the vertical portion of each bracket 16 is pivotally secured the rear end of a bar 22 by means of a pivot 23 which extends forwardly and then upwardly in an ornamental curve 24 where it is riveted as at 25 to a projection 26 on the upper end of the companion pivoted front runner section 15. The bars 22 constitute the upper members of the front or dirigible runners.

Pivotally secured to the underside of each of the bars 22 near the forward portion thereof as indicated at 28 is a cross member 27 which has its end downwardly offset as shown. The center of the cross member 27 has mounted therein a pivot pin 28' which passes through the center of a rockable steering bar 30. Suitable spacer washers 29 on the pin 28' are interposed between the cross bar 27 and the steering bar 30 which is of a conventional type and extends transversely across the forward part of the sled and outwardly from the sides thereof as shown in Figure 1. Upper and lower straps 31 are rigidly secured to the central portion of the steering bar 30 by bolts or rivets 32, and the straps extend slightly downwardly and rearwardly in vertically spaced relation so as to be placed one above and one below the forward curved edge portion 33 of the top plate or seat 7. A pivot 34 anchored in the seat 7 engages through slots 35 extending longitudinally in the rear portions of the straps 31. The pivot 34 extends through both of said straps and through the portion of the plate 7 which is embraced therebetween. It is obvious that with the structure described, pressure upon either side or end of the steering bar 30 will result in turning the forward runners so that they are deflected to one side or the other and the sled caused to veer in the direction given them.

It is to be definitely understood that I do not desire to limit the application of this invention to the particular modification set out herein to illustrate the principles thereof, and any change or changes may be made in material and structure and arrangement of parts consistent with the spirit and scope of the invention.

Having thus described the invention what is claimed as new is:—

1. In a sled comprising a relatively stationary rear section and a swingable front section, the rear section comprising a pair of transversely spaced members each of which consists of a runner and a vertically spaced side bar, the front section comprising a pair of transversely spaced members each of which consists of a runner and a vertically spaced side bar; means swingably connecting the front ends of the rear runners to the rear ends of the front runners, and other means swingably mounting the rear ends of the front side bars forwardly of and adjacent to but not connected to the front ends of the rear side bars.

2. In a sled comprising a rear section and a swingable front section, the rear and front sections each comprising a pair of transversely spaced members, each of said members comprising a runner and a side bar vertically spaced from the runner, lower pivot means connecting the front ends of the rear runners with the rear ends of the front runners, upper pivot means pivotally connecting the rear ends of the front side bars to a portion of the rear members forward of and adjacent to the front ends of the rear side bars, said lower pivot means having its axis forward of the axis of said upper pivot means.

3. In a sled comprising a rear section and a swingable front section each of the sections comprising a pair of transversely spaced members each of which comprises a runner and a side bar spaced thereabove, vertical bracket means vertically spacing the runner and side bar of the members of said rear section, means swingably connecting the rear ends of the front runners to the front ends of the rear runners, second means swingably connecting the rear ends of the front side bars to said bracket means forward of and adjacent to the front ends of the rear side bars.

4. In a sled comprising a rear section and a swingable front section each comprising a pair of transversely spaced members each of which comprises a runner and a side bar spaced thereabove, a vertical bracket vertically spacing the runner and side bar of the members of the rear section, a pivot swingably connecting the rear ends of the front runners to the front ends of the rear runners, a second pivot swingably connecting the rear ends of the front side bars to a portion of said bracket the front ends of the rear side bars, being connected to a portion of the bracket to the rear of said second pivot, a cross member extending between and pivoted at its ends to the front side bars intermediate their ends, a steering bar pivoted to the center of said cross member, a lever fixed to the pivotal center of said steering bar and extending rearwardly, a seat member carried by and between the rear side bars, and a pin and slot connection between the rear end of said lever and the front part of said seat member.

5. In a sled comprising a rear section and a swingable front section each comprising a pair of transversely spaced members each of which comprises a runner and a side bar spaced thereabove, a vertical bracket spacing the runner and side bar of the members of said rear section, a pivot swingably connecting the rear ends of the front runners to the front ends of the rear runners, said bracket means comprising an upright having on its upper end a rearwardly extending portion to which the forward end of the rear side bar is connected, the rear end of the front side bar being swingably connected to a portion of said upper end of the upright forwardly of the point of connection of the front end of the rear side bar, said bracket having its lower end connected to the rear runner at a point to the rear of the point of connection of the front runner with said rear runner.

6. A dirigible sled consisting of a rear section and a front dirigible section, said rear section consisting of a pair of runners each of which is composed of a ground engaging lower bar and an upper bar, a front vertical bracket and a rear vertical bracket spacing and connecting said upper and lower bars, said front vertical bracket having on its upper end a rearward extension to which the front end of the upper bar is fastened, said ground engaging bar having on its front end a forward extension; said front dirigible section consisting of a pair of runners each of which is composed of a vertically curved lower bar and a relatively straight upper bar, the front ends of the last-mentioned bars being connected together, the rear end of said upper bar of the front section resting upon the upper end of said front vertical bracket and pivoted thereto, the rear end of said lower bar of the front section engaging the underside of and pivoted to said forward extension of the front end of the lower bar of the rear section, a transverse brace extending between said upper bars of said rear section, and connected to the upper end of said front vertical bracket, a seat resting on said transverse brace between the runners of said rear section, a cross member extending between and having its opposite ends pivotally connected to the upper bars of said front dirigible section, a steering bar pivoted to the center of said cross member and having a rigidly fastened arm extending rearwardly therefrom having its rear end loosely pivoted to a central portion of the front end of said seat.

7. In a dirigible sled including a runner composed of a front dirigible section, and a rear section, said front and rear sections each being composed of an upper bar and a lower bar, a vertical bracket spacing and connecting the upper and lower bars of said rear section, said bracket including a rearward extension on its upper end and the lower end of said bracket being connected to the lower bar of said rear section at a point to the rear of the front end of the lower bar of said rear section, a pivot in said rearward extension pivotally connecting the rear end of the upper bar of said front dirigible section, a second pivot in the lower bar of said rear section forward of said bracket and connecting the rear end of the lower bar of said front dirigible section thereto, the first mentioned pivot being thereby rearwardly displaced with respect to said second pivot.

ALBERT B. LAMOY.